United States Patent
Ooe

[19]

[11] Patent Number: 5,901,328
[45] Date of Patent: May 4, 1999

[54] SYSTEM FOR TRANSFERRING DATA BETWEEN MAIN COMPUTER MULTIPORT MEMORY AND EXTERNAL DEVICE IN PARALLEL SYSTEM UTILIZING MEMORY PROTECTION SCHEME AND CHANGING MEMORY PROTECTION AREA

[75] Inventor: Kazuichi Ooe, Kawasaki, Japan

[73] Assignee: Fujitsu Limited, Kawasaki, Japan

[21] Appl. No.: 08/936,610

[22] Filed: Sep. 24, 1997

Related U.S. Application Data

[63] Continuation of application No. 08/388,601, Feb. 14, 1995, abandoned.

[30] Foreign Application Priority Data

Feb. 14, 1995 [JP] Japan ..................................... 6-017057

[51] Int. Cl.⁶ .............................. G06F 12/16; G06F 12/14
[52] U.S. Cl. .......................... 395/825; 395/827; 395/848; 711/100; 711/147; 711/149; 711/152
[58] Field of Search ..................................... 395/821, 825, 395/827, 848; 711/100, 149, 147, 152

[56] References Cited

U.S. PATENT DOCUMENTS

| | | | |
|---|---|---|---|
| 4,388,695 | 6/1983 | Heinemann .............................. | 364/900 |
| 4,434,464 | 2/1984 | Suzuki et al. ............................ | 364/200 |
| 4,925,311 | 5/1990 | Neches et al. ........................... | 364/200 |
| 4,989,113 | 1/1991 | Hull, Jr. et al. ......................... | 364/200 |
| 5,027,317 | 6/1991 | Pepera et al. ........................... | 364/900 |
| 5,029,124 | 7/1991 | Leahy et al. ............................. | 364/900 |
| 5,050,213 | 9/1991 | Shear ....................................... | 380/25 |
| 5,072,373 | 12/1991 | Dann ....................................... | 395/200 |
| 5,099,417 | 3/1992 | Magar et al. ........................... | 395/425 |
| 5,224,093 | 6/1993 | Denzel et al. ............................ | 370/60 |
| 5,280,589 | 1/1994 | Nakamura ............................... | 395/325 |
| 5,319,780 | 6/1994 | Catino et al. ........................... | 395/600 |
| 5,426,737 | 6/1995 | Jacobs ..................................... | 395/275 |
| 5,459,851 | 10/1995 | Nakajima et al. ....................... | 395/476 |
| 5,651,139 | 7/1997 | Cripe et al. ............................. | 395/490 |

FOREIGN PATENT DOCUMENTS

304236 A2  2/1989  European Pat. Off. ......... H04N 5/45

Primary Examiner—Thomas C. Lee
Assistant Examiner—Rehana Perveen
Attorney, Agent, or Firm—Staas & Halsey

[57] ABSTRACT

A memory protection setting unit sets a protection area in a multiport memory provided with two ports, that is, port A and port B. The CPU accesses the multiport memory through port A. At this time, an area other than the protection area can be accessed. The CPU transmits data to an external device through a transfer control device. The transfer control device accesses the multiport memory through port B. Only the protection area can be accessed at this time. Upon receipt of a request from the CPU, the transfer control device writes data received from the external device to the protection area and reads data to be sent to the external device from the protection area. Protection is removed by the memory protection setting unit from the protection area where data is read or written by the transfer control device.

34 Claims, 15 Drawing Sheets

|  | STARTING ADDRESS | SIZE |
|---|---|---|
| PREG 0 | ADDR 0 | BYTES 0 |
| PREG 1 | ADDR 1 | BYTES 1 |
| PREG 2 | ADDR 2 | BYTES 2 |

PACKET HEADER

| FUNCTION | PREG No. | NUMBER OF BYTES |
|---|---|---|
|  |  |  |

Fig. 4B

REGISTER FOR DMA

| PREG No. | NUMBER OF BYTES |
|---|---|
|  |  |

Fig. 4C

SYSTEM FOR TRANSFERRING DATA BETWEEN MAIN COMPUTER MULTIPORT MEMORY AND EXTERNAL DEVICE IN PARALLEL SYSTEM UTILIZING MEMORY PROTECTION SCHEME AND CHANGING MEMORY PROTECTION AREA

This application is a continuation of application Ser. No. 08/388,601, filed Feb. 14, 1995, now abandoned.

BACKGROUND OF THE INVENTION

1. Field of the Invention

The present invention relates to a computer system for inputting/outputting data between the main memory and an external device, and more specifically to a computer system having improved capabilities of inputting/outputting data to an external device connected to another processing device in a parallel computer system in which a plurality of processing devices are interconnected over a network.

2. Description of the Related Art

As large-scale general-purpose computers performing processes serially are reaching the limits of process speed both in hardware technology and logical method, there is an increasing demand for parallel computer systems for performing parallel processes using a plurality of processing elements (hereinafter referred to as cells). Particularly, simulation in scientific technologies (aeromechanics, molecular chemistry, weather analysis, etc.) requires a large amount of calculations to secure the reliability and precision of a solution, etc., and the parallel computers are strongly demanded to shorten the time taken for necessary calculations.

There is, as a form of these parallel computers, a well-known system comprising cells provided with I/O devices such as external magnetic disk storage devices (hereinafter referred to as I/O cells) and cells not provided with those I/O devices (hereinafter referred to as non-I/O cells.

In such a system, a file is generated in an external storage device of an I/O cell and shared by another cell. When writing and reading data from and to the file, a non-I/O cell need access to the I/O cell having the file.

An input/output (I/O) instruction process to access the cell, etc. is performed normally using an I/O instruction packet. In this case, the I/O instruction packet is transmitted from a non-I/O cell to an I/O cell over a network in which they are interconnected.

Upon receipt of the I/O instruction packet, the I/O cell analyzes the contents of the packet, performs a specified process, and returns the process result to the requesting cell through an answer packet. If a reading process is specified, specified data is transmitted from the answer packet to the requesting cell. Since a large amount of data is normally transmitted by the I/O instruction between cells, the received data is not temporarily stored in a buffer in an interface provided between a process device and the network, but directly written to a memory accessible by the process device in order to reduce communications overhead and improve the throughput of the system. That is, with the buffer, data can be copied frequently between the buffer and the memory, thereby requiring a lot of overhead.

Conventionally, in the method in which received data is directly written in a memory, the interface uses a read instruction, for example, to notify the process device of an interruption after all specified data have been stored in a specified area of the memory. Upon receipt of the interruption, the process device reads the received device from the specified area in the memory, performs a corresponding process, reads the specified data from the file of its cell, and transmits the data to the I/O cell through the answer packet.

Assume that data is read from an I/O cell according to a read instruction with the above described configuration in a massively parallel processor. In this case, the throughput of the system can be much more improved by generating an answer packet each time a predetermined length of data is read from the cell according to a read instruction to the I/O cell to send all data to the requesting cell after putting them separately in a plurality of answer packets than by sending all data in a single answer packet to the requesting cell after reading the data requested according to the instruction. That is, in the former method, a task operating in a processing device reads and processes data sequentially from a specified memory area, and concurrently receives the data.

Likewise, when the I/O cell receives a write instruction, the task of the requesting cell can sequentially access an area in a specified memory to which data has been transferred, and the operation of the task and the transmission of data can be concurrently performed.

FIG. 1 shows the data read operation in which a non-I/O cell sends a read instruction to an I/O cell by the divisional packet method in a conventional massively parallel processor system.

In FIG. 1, a cell 10 is a non-I/O cell, but is provided with a processing device. It is connected to an I/O cell provided with a file server 32 over a network comprising a torus network 20. The file server 32 provides the cell 10 with the file access function if the I/O instruction received from the cell 10 is a file read/write instruction. The I/O cell 30 is connected to a disk device 34 (magnetic disk device) in which a file 36 is generated.

With the above described configuration, the cell 10 sends an I/O instruction packet 42 for a reading operation to the I/O cell 30 if data is to be read from the file 36. Upon receipt of an I/O instruction packet 42, the file server 32 of the I/O cell 30 sequentially reads specified data from the file 36, sequentially generates data packets 52, 53, and 54, and transmits them to the cell 10 over the torus network 20.

FIG. 2 shows the process of the cell 10 in the above described operation.

(a) First, a user task of the cell 10 opens a file to be accessed according to an open instruction and receives an identifier fd of the file from the file server 32. Then, it specifies the file identifier fd by a parameter and issues a read instruction. Thus, the I/O instruction packet 42 for a reading operation is transmitted to the I/O cell 30 over the torus network 20.

(b) The user task continues its operation on processes which can be performed regardless of the completion of the reading operation.

(c) If a process is to be performed using the data required in the reading operation, a wait instruction is issued to receive a data packet.

(d) If the data packet 52 arrives at the cell 10 and the processing device of the cell 10 is informed of an interruption, then the processing device starts the interrupting process and writes the data received through the data packet 52 to an area 14.

(e) The user task of the cell 10 reads data from the area 14 of the memory 12 and performs the processes requiring the data. When the subsequent data is required, the wait instruction is issued and the subsequent data packet 53 is expected as in (c). Upon arrival of the data packet 53, the data stored in the packet 53 is processed as in (d) and (e). If the last data packet 54 arrives and the data stored in the packet 54 is completed, the process of data required in the reading operation is completed through the I/O instruction packet 42. The data received through the data packets 53 and 54 is stored in the areas 16 and 18 through the interrupting process.

Conventionally, when the cell 10 receives an answer packet such as the above described data packets from an I/O cell, it interrupts the processing device and informs the processing device of the reception of the answer packet. The processing device is required to process the data stored in the answer packet. Thus, the interrupting process is overhead to the processing device, and the cell 10 has less opportunities to concurrently perform operations of user tasks and I/O processes, thereby reducing the throughput of the entire system.

SUMMARY OF THE INVENTION

The present invention aims at improving the performance of a massively parallel processor system by concurrently performing by the non-I/O cell the operations of a user task and an I/O process when the non-I/O cell performs an I/O process such as a transmission of data to an I/O cell.

That is, the present invention is based on a computer system provided with a transfer control device for transmitting data between a data processing device and an external device at a request of the data processing device.

The system comprises a multiport memory which is provided with a first port and a second port and can set protection areas; a memory protection setting unit for setting a protection area in the multiport memory; a memory protection management unit for notifying the data processing device of inaccessibility when the data processing device accesses from the first port the memory protection area in the multiport memory and for notifying the data processing device of accessibility when the transfer control device accesses from the second port the protection area in the multiport memory; and a protection area change unit for changing the range of the protection area depending on the data read or write area.

The present invention is also based on a computer system in which a plurality of cells are interconnected over a network to transmit data by communicating messages over the network.

Each cell comprises a transfer control device for transmitting a message to and from another cell over the network; a multiport memory which is provided with a first port and a second port and can set protection areas; a memory protection setting unit for setting a protection area in the multiport memory; a memory protection management unit for notifying the data processing device of inaccessibility when the data processing device accesses from the first port the memory protection area in the multiport memory and for notifying the data processing device of accessibility when the transfer control device accesses from the second port the protection area in the multiport memory; and a protection area change unit for changing the range of the protection area when data is read or written.

Each cell transmits an I/O read instruction packet to another cell through the transfer control device over the network when reading data from an external device connected to another cell. When the other cell receives the I/O read instruction packet through its own transfer control device, it reads from the external device the data specified by the I/O read instruction packet, generates an answer packet assigned data and information indicating the size of data, etc. for each piece of read data, and transmits the packet by the transfer control device to the requesting cell through the network. Each time the requesting cell receives the answer packet through its own transfer control device over the network, the transfer control device retrieves received data from the answer packet and writes the received data to the protection area in the multiport memory through the second port. The protection area change unit changes the range of the protection area set by the memory protection setting unit according to the information set in the answer packet.

Furthermore, the present invention is based on a computer system in which a plurality of cells are interconnected over a network and each cell transmits data to another cell by communicating a message over the network. Each of the cells comprises a transfer control device for transmitting a message to and from another cell over the network; a multiport memory which is provided with a first port and a second port and can set protection areas; a memory protection setting unit for setting a protection area in the multiport memory; a memory protection management unit for notifying the data processing device of inaccessibility when the data processing device accesses from the first port the memory protection area in the multiport memory and for notifying the data processing device of accessibility when the transfer control device accesses from the second port the protection area in the multiport memory; and a protection area change unit for changing the range of the protection area when data is read or written.

When each cell writes data to an external device connected to another cell, the transfer control device reads data from the protection area in the multiport memory and transmits the data to another cell over the network through the I/O write instruction packet. When the other cell receives the I/O write instruction through its own transfer control device, the transfer control device writes the data stored in the I/O write instruction packet to the external device, and transmits for each piece of written data the information of the data to the requesting cell through an answer packet over the network. Each time the transfer control device of the requesting cell receives the answer packet over the network, the protection area change unit updates the contents of the memory protection area set by the memory protection setting unit based on the information of the written data set in the answer packet.

BRIEF DESCRIPTION OF THE DRAWINGS

FIGS. 4A, 4B, and 4C respectively show the configurations of the protection register, packet header, DMA register;

DESCRIPTION OF THE PREFERRED EMBODIMENTS

Figure 1:
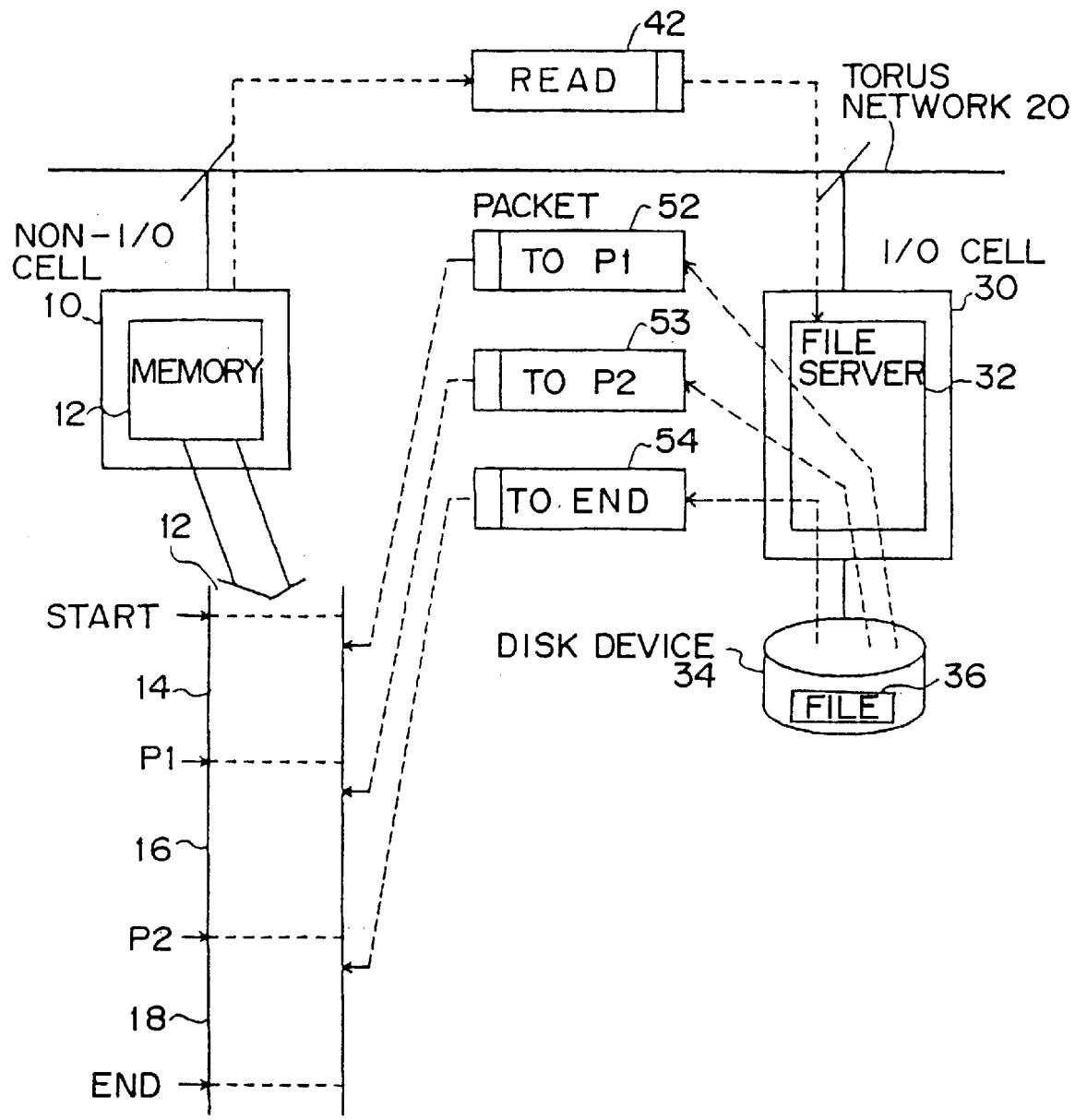
FIG. 1 shows the method of reading data between cells in the conventional massively parallel processing system.
Figure 2:
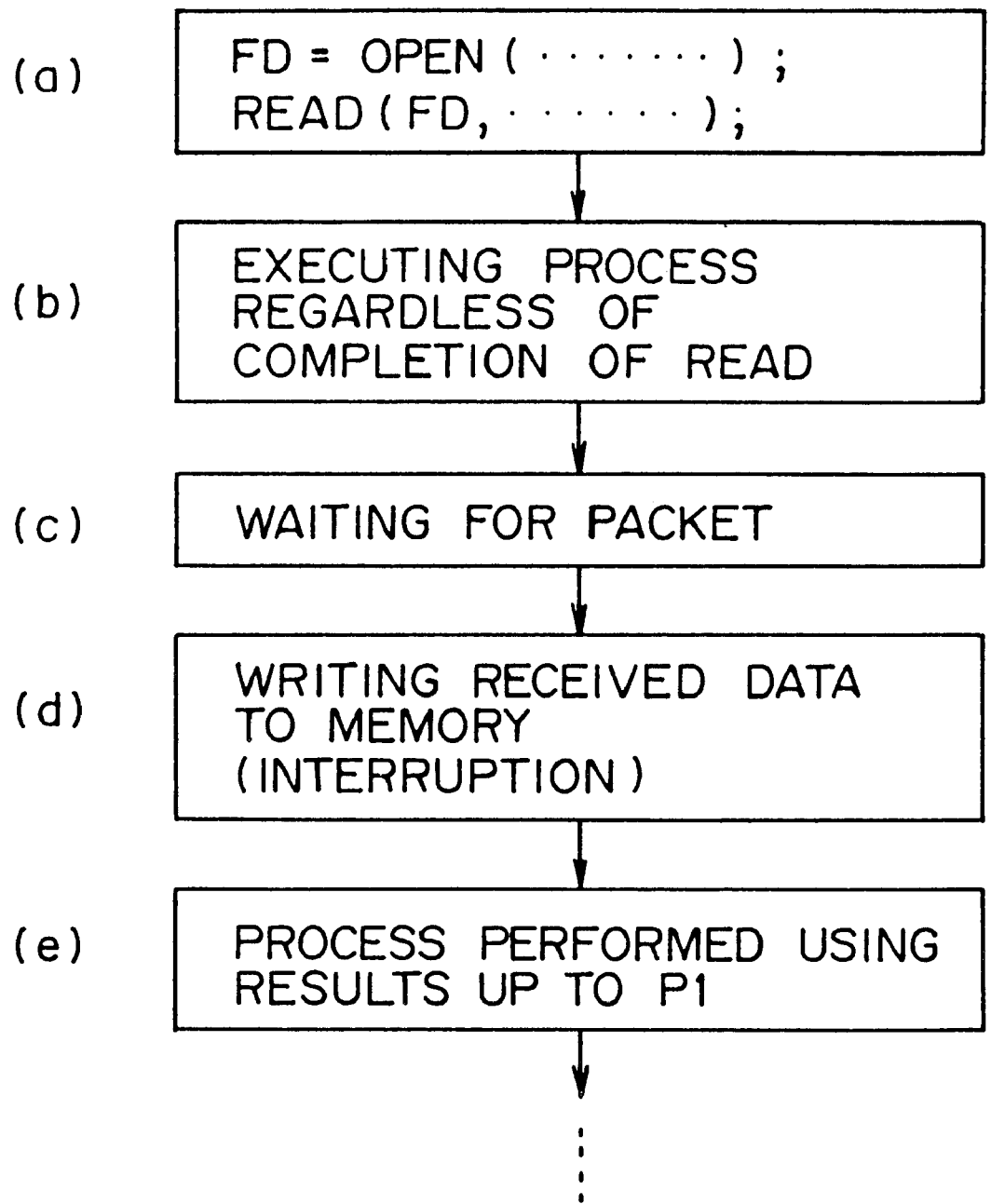
FIGS. 2(a)–(e) are a flowchart showing the data read process of the non-I/O cell in the massively parallel processor system according to FIG. 1.
Figure 3:
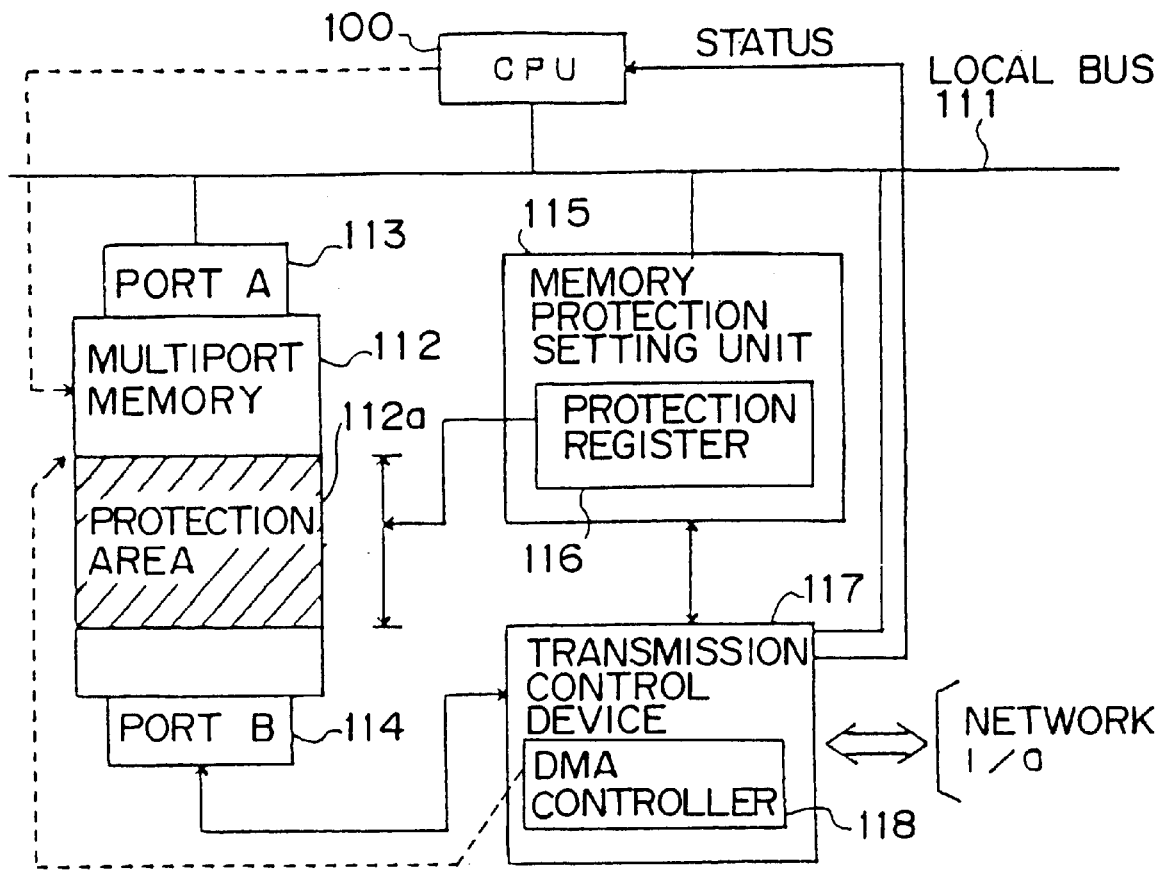
FIG. 3 shows the principle of the present invention.

FIG. 3 shows the principle of the present invention.

A central processing unit (CPU) 100 performs a user task. Connected to the CPU 100 are a multiport memory 112 having a plurality of ports via a local bus 111 and a memory protection setting unit 115. The multiport memory 112 is provided with a first port 113 (port A) and a second port 114 (port B). The memory protection setting unit 115 contains a protection register 116 with which a protection area 112a is set in the multiport memory 112 using the protection register 116.

The protection register 116 stores the information indicating the range of the protection area 112a. A transfer control device 117 controls the input/output of data to an external device over a network or an input/output device. The transfer control device 117 contains a DMA controller 118. The DMA controller 118 reads the data output by the transfer control device 117 to the external device through a direct memory access (DMA) to the protection area 112a. Then, the transfer control device 117 transfers the data input by the transfer control device 117 from the external device to the protection area 112a through the DMA.

The operation of the above described configuration is described below.

The CPU 100 inputs/outputs to an external device by performing a user task using the multiport memory 112. The memory protection setting unit 115 does not allow the protection area 112a in the multiport memory 112 to be accessed by the first port 113. On the other hand, it allows the protection area 112a to be accessed by the second port 114.

FIG. 4A shows an example of the configuration of the protection register 116 used to set the protection on the multiport memory 112. Each of the protection registers 116 (PREG 0, PREG 1, PREG 2, . . . ) contains two pieces of information about the starting address and size of data. Each piece of the information is assigned an individual number. The starting address refers to the head of the protection area in the multiport memory 112. The size refers to, for example, the length in bytes of the protection area 112a. The last address of the protection area can be set instead of the size.

Normally, the CPU 100 accesses the memory at the first port 113. On the other hand, the transfer control device 117 accesses the memory at the second port 114. For example, when the CPU 100 requests the transfer control device 117 to enter data from an external device, the request is transmitted to the external device. If the external device transmits the data in response to the request, the transfer control device 117 activates the DMA controller 118 and writes the transmitted data to the protection area 112a of the multiport memory 112 through the second port 114.

The data are entered using packets. FIG. 4B shows an example of the format of a packet header. The function refers to the information indicating the instruction type such as an input, output, etc. of data. The PREG number refers to the information indicating the number (PREG number) of the protection register 116 used in setting the protection area in the multiport memory 112. The number of bytes refers to the size of input/output data.

Upon receipt of an answer packet, the transfer control device 117 checks the packet header. If the function is to input data, then the data transmitted from the external device is retrieved from the answer packet according to the number of bytes specified by the header. The protection area 112a, to which the data are written, is obtained by referring to the protection register 116 specified by the PREG number of the answer packet header. Then, the transfer control device 117 controls the DMA controller 118 to transfer the retrieved data to the protection area 112a. Based on the amount of the data, the starting address and the size of the protection register 116 are updated and the transmission process terminates. After the protection register 116 is updated, the CPU 100 can immediately read from the first port 113 the data transmitted through the answer packet and written to the multiport memory 112.

The protection area can be set through the protection register 116 by mounting a circuit for determining the accessibility of the first port 113 and the second port 114 of the multiport memory 112 by comparing the access address with the contents of the specified protection register 116. That is, the determination circuit allows the transfer control device 117 to write received data to the protection area 112a in the multiport memory 112 through the second port 114, updates the contents of the protection register 116, and then removes the data-written portion from the protection area 112a. Thus, the CPU 100 can immediately read through the first port 113 the data written by the transfer control device 117 from the portion where protection is removed.

Data can be transmitted using the memory protection capabilities in the multiport memory 112 when the data are output to an external device. At this time, the CPU 100 writes the settings of the protection area 112a of the multiport memory 112 to the protection register 116 of the memory protection setting unit 115. Then, it writes the data to be transmitted to the external device to the protection area 112a through the first port 113, and informs the transfer control device 117 of the data-written protection register 116 and requests the transfer control device 117 to transmit the data to the protection register 116.

The transfer control device 117 refers to the contents of the protection register 116 to obtain the position of the protection area 112a, controls the DMA controller 118 to read through the DMA the data written by the CPU 100 to the protection area 112a, and transmits the data to the external device. The protection is removed from the portion where the transmitted data are stored by updating the protection register 116, and the CPU 100 immediately allows the memory to be accessed through the first port 113.

Described below in detail is the configuration and operation of the transfer control device 117. The DMA controller 118 built in the transfer control device 117 is provided with, for example, a DMA register 119. When the transfer control device 117 receives data from an external device, it receives the data through an answer instruction packet. Then, it sets in the DMA register 119 the PREG number and the number of bytes written to the header of the answer packet, and activates the DMA controller 118. The DMA controller 118 refers to the DMA register 119 to read the contents of the protection register 116 specified by the PREG number written to the DMA register 119. Based on the starting address and the size set in the protection register 116, the DMA controller 118 is informed of the protection area 112a in the multiport memory 112 to be used by the CPU 100. Then, it transfers through the DMA the received data to the protection area through the second port 114. Upon completion of the data transmission, the transfer control device 117 updates the contents of the protection register 116. That is, the starting address is updated for the length of the transmitted data, and the number of bytes is decremented by the number of bytes of the transmitted data. Thus, a portion of the protection area 112a, that is, the portion where the received data are written, becomes accessible by the CPU 100.

Therefore, the CPU 100 can read the data received from the external device from the multiport memory 112 when necessary without an interruption process. The CPU 100 can constantly access areas in the multiport memory 112 other than the protection area 112a through the first port 113.

Thus, performed concurrently are a user task to be performed by the CPU 100 and a data transmission process performed by the transfer control device 117 to and from an external device. Furthermore, by efficiently encoding a user task program, the transfer control device 117 receives data from an external device and concurrently the CPU 100 processes the data already received by the transfer control device 117. Thus, the CPU 100 concurrently receives data from the external device and processes the received data without extra overhead such as an I/O wait, etc. Since the CPU 100 operates quickly and the memory protection function sufficiently works when the CPU 100 tries to access the protection area 112a where no data has been written yet, the CPU 100 cannot erroneously process data.

That is, when the CPU 100 accesses the protection area 112a of the multiport memory 112 through the first port 113, an address exception error informs the user task of the CPU 100 of no received data. Otherwise, there can be a mechanism designed such that an instruction to access the protection area is held to keep the user task ignorant of no received data until the protection is released.

Figure 5:
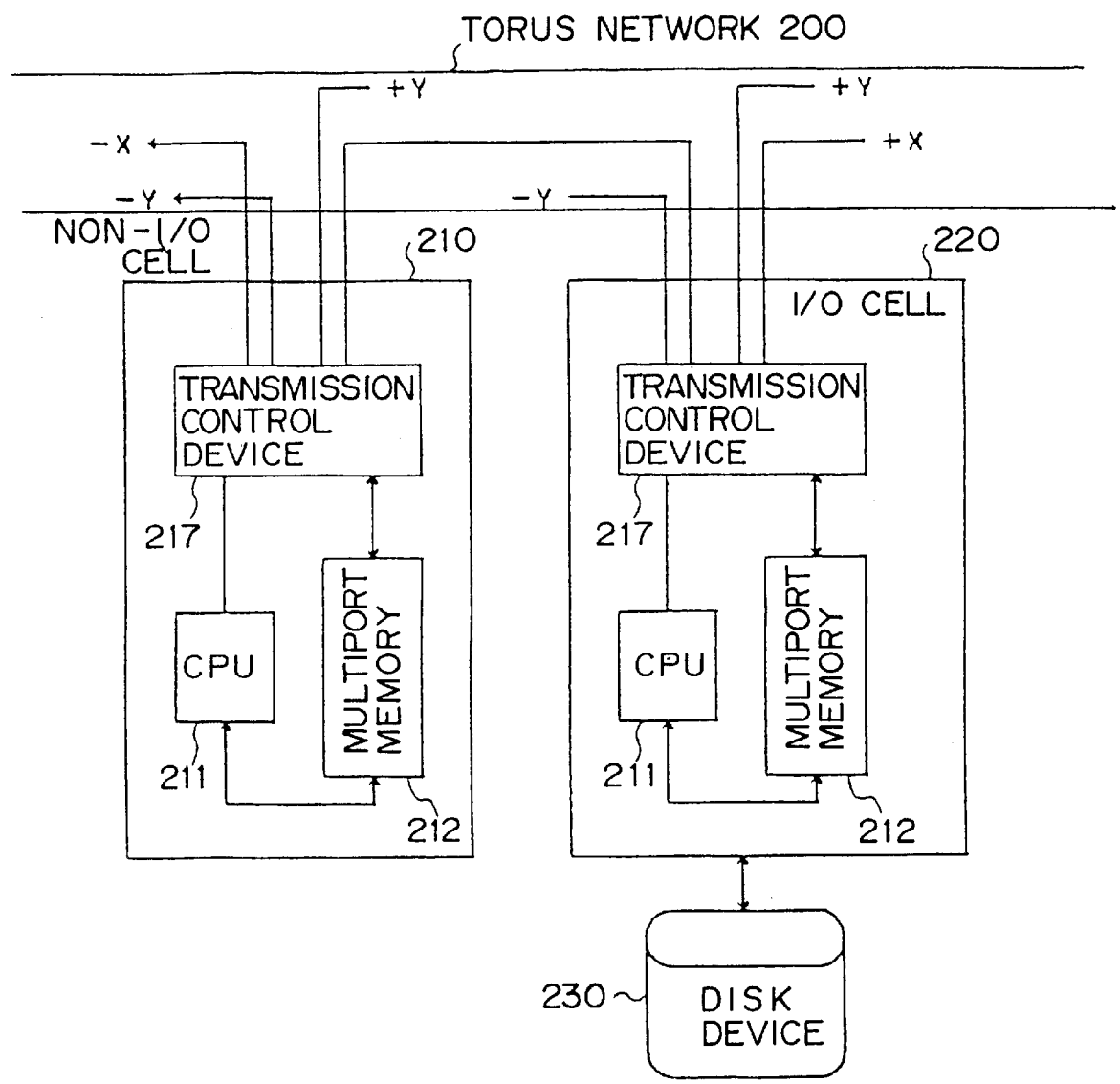
FIG. 5 is a block diagram showing the configuration of the massively parallel processor as an embodiment of the present invention.

FIG. 5 is a block diagram showing the configuration of the massively parallel processor system as an embodiment of the present invention.

Listed below are the reference documents of massively parallel processor systems.

1. *Architecture and Performance Evaluation of Massively Parallel Processors AP*1000, Jul. 16, 1991 by Horie, Ishihata, Shimizu, and Ikesaka published by Institute of Electronic Information Communications, CPSY91-26, P.173–180; and
2. *Routing System in Interconnected Network in Parallel Processor AP*1000 by Horie, Ishihata, and Ikesaka, O-I Vol.J75-O-I, No.8, pp.600–606,1992.8, etc. published as thesis by Institute of Electronic Information Communications.

A plurality of cells are interconnected over a torus network 200 in the massively parallel processor system. The cells are classified into two groups, that is, non-I/O cells 210 and I/O cells 220. The non-I/O cell 210 comprises a CPU 211, transfer control device 217, multiport memory 212, etc. The I/O cell 220 comprises a CPU 211, transfer control device 217, multiport memory 212, etc. and a disk device 230 is connected to the I/O cell 220. All cells can be I/O cells 220. The above described disk device 230 comprises, for example, a magnetic disk device, optical magnetic disk device, etc.

Figure 6:
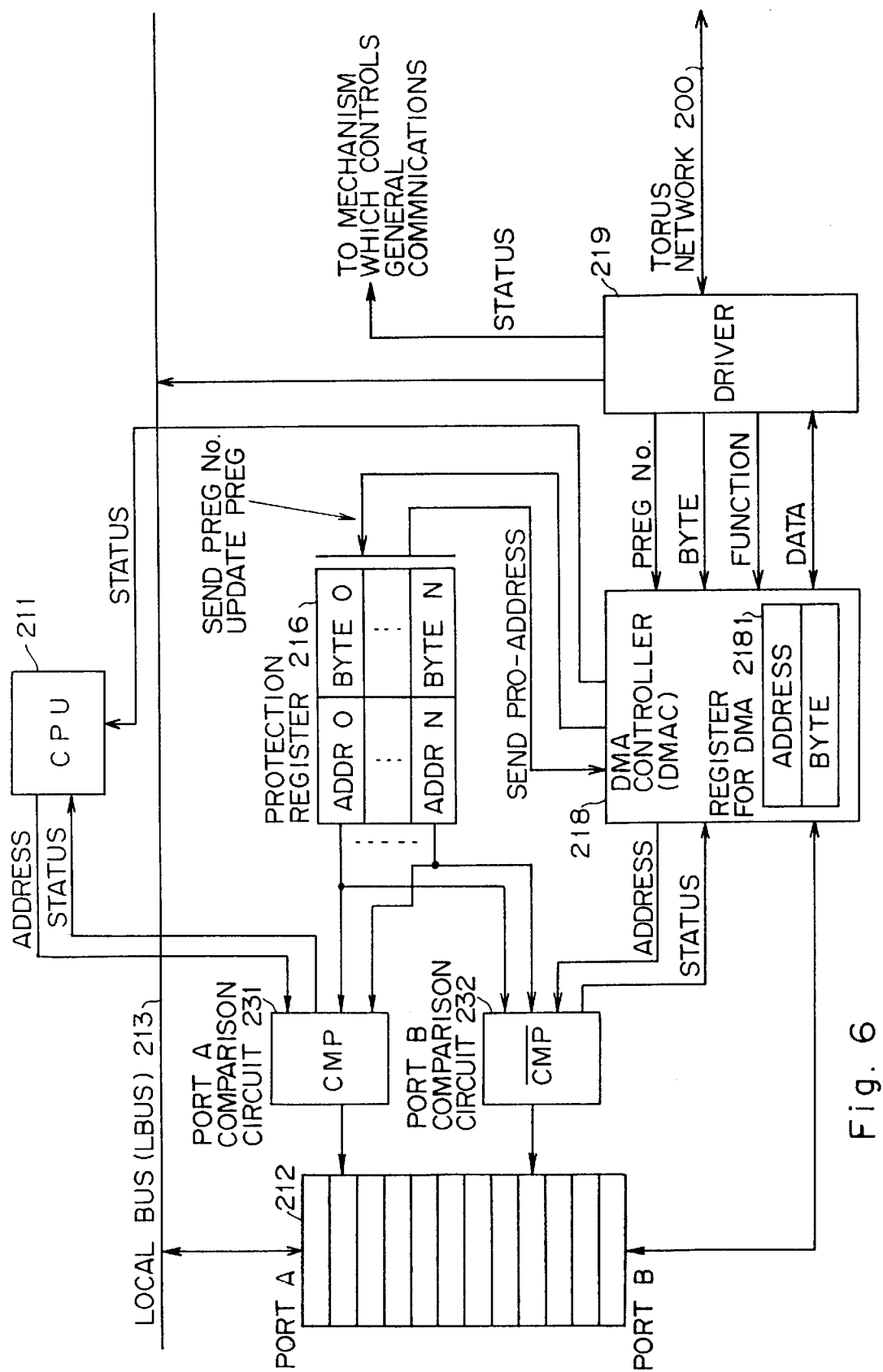
FIG. 6 is a block diagram showing the important portion of the non-I/O cell according to the embodiment.

FIG. 6 is a block diagram showing the configuration of the important portion of the non-I/O cell 210.

The multiport memory 212 is used when data are transmitted to and from another device such as the I/O cell 220, etc., and is provided with memory protection capabilities. The multiport memory 212 is provided with two ports, that is, port A and port B, and is connected to the CPU 211 via a local bus 213. Port A cannot be accessed at a protected area, while port B can be accessed only at a protected area.

A protection register 216 sets protection in the multiport memory 212. The protection register 216 comprises an address section in which the leading address (addr0, . . . ) of the protection area is set and a size section in which the size of the protection area is set in bite units (byte0, . . . ).

The memory is accessed by the CPU 211 through Port A. When the CPU 211 accesses the multiport memory 212, a port A comparison circuit 231 compares the address output by the CPU 211 with the address of the protection register 216 to check whether or not the address accessed by the CPU 211 is contained in the protection area. If yes, the port A comparison circuit 231 returns inaccessibility status information Status to the CPU 211. Thus, the CPU 211 is not permitted to access the protection area.

A driver 219 is a routing controller (RTC) for controlling the data transmission to and from another cell over the torus network 200. For example, if data received through an answer packet from another cell over the torus network 200, the DMA controller 218 is activated to write the received data to the protection area in the multiport memory 212 through port B. At this time, the driver 219 retrieves from the answer packet a protection register number (PREG number), function type indicating the type of instruction such as a read instruction, write instruction, etc., the number of bytes of transmitted data, the received data, etc., and then provides them for the DMA controller 218.

The DMA controller 218 transmits the data of the specified number of bytes to the protection area of the protection register 216 having the specified protection register number. After the transmission, the DMA controller 218 updates the leading address and the number of bytes of the protection register 216 and removes the protection from the area where the received data are written. The DMA controller 218 comprises a DMA register 2181. The DMA register 218 stores the address and the number of bytes set in the protection register 216 of the protection register number specified by the I/O packet header of, for example, a read instruction.

The DMA controller 218 and a driver 300 form the transfer control device 217 shown in FIG. 5.

A port B comparison circuit 232 checks whether or not the DMA controller 218 tries to access the protection area of the multiport memory 212 through port B. The port B comparison circuit 232 compares the address received from the DMA controller 218 with the contents of the protection register 216, and returns inaccessibility status information Status to the DMA controller 218 if the DMA controller 218 is trying to access an area other than the protection area.

Figure 7:
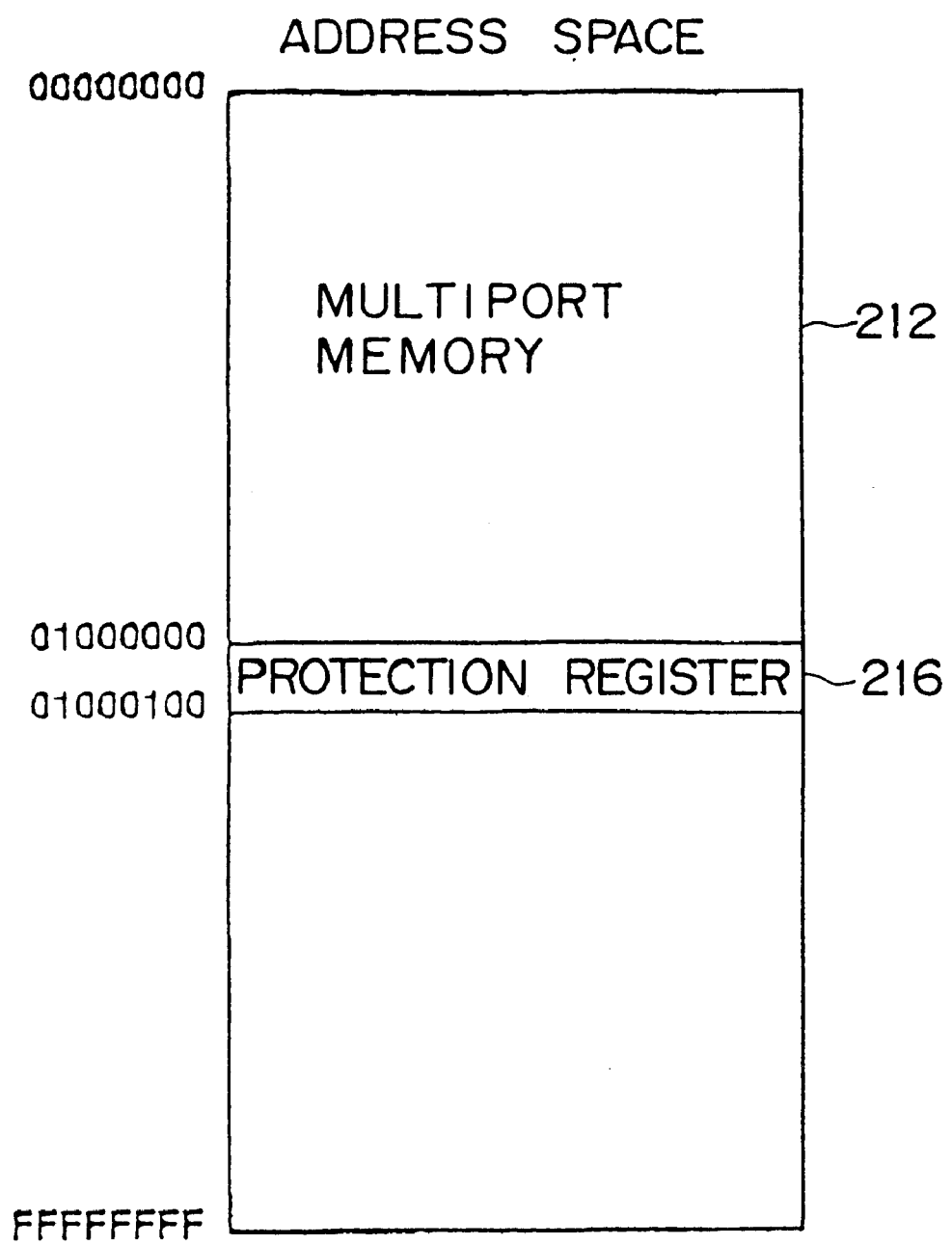
FIG. 7 shows the address space of the CPU of the non-I/O cell.

FIG. 7 shows the address space of the CPU 211. As shown in FIG. 7, the multiport memory 212 is mapped from address 00000000H to 01000000H, and a plurality of protection registers 216 are mapped from 01000001H to 01000100. H indicates a hexadecimal number.

Figure 8:
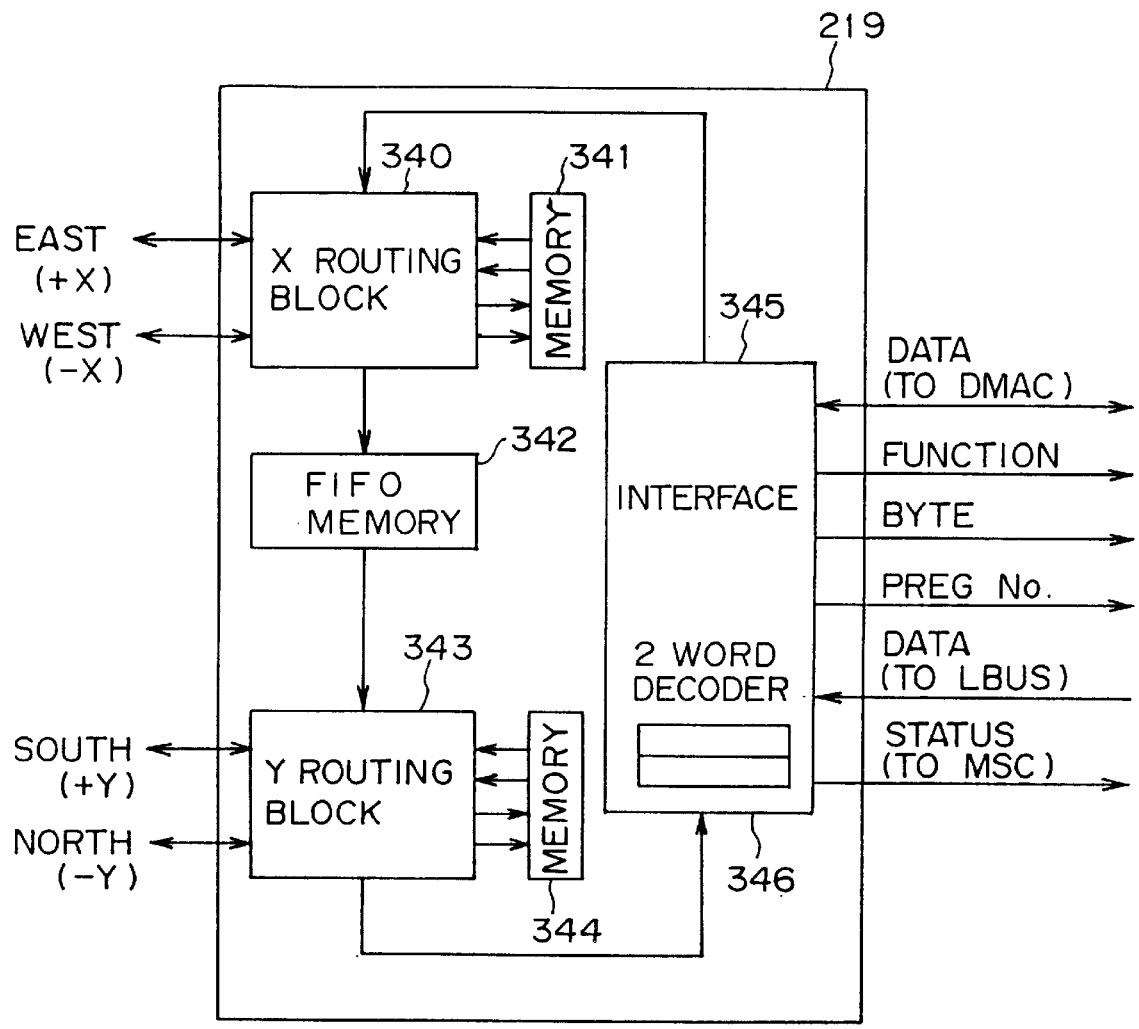
FIG. 8 is a block diagram showing an embodiment of the driver in the non-I/O cell.

FIG. 8 is a block diagram showing an example of the configuration of the driver 219.

An X routing block 340 has a memory 341 as a buffer and controls data transmission in the X direction in the two-dimensional torus network 200. A FIFO memory 342 is a first-in-first-out memory and passes to a Y routing block 343 the data to be transmitted in the Y direction and the data received by the related cell. The Y routing block 343 has a memory 344 as a buffer and controls data transmission in the Y direction in the two-dimensional torus network 200.

An interface 345 controls the sending of data from the related cell and the receiving of data at the related cell. Among the input/output signals of the interface 345 shown in FIG. 8, data (to DMAC) refers to the data transmitted by the DMA controller 218, function (to DMAC) refers to the function type of an instruction, byte (to DMAC) refers to the number of transmitted data bytes, PREG number (to DMAC) refers to a protection register number, data (to LBUS) refers to transmission data to the local bus 213, and status (to MSC) refers to a status information signal to be transmitted to a mechanism (MSC) for controlling general communications.

The MSC indicates a message controller described in the above listed reference document *Architecture and Performance Evaluation of Massively Parallel Processors AP1000*, published as document CPSY91-26, P.174 by the Institute of Electronic Information communications on Jul. 16, 1991. The interface 345 comprises a 2-word decoder 346.

Figure 9:
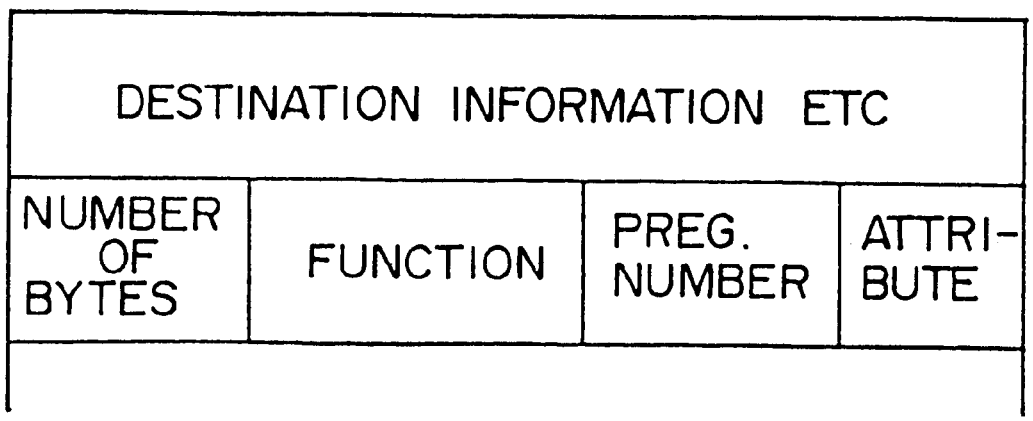
FIG. 9 shows the format of the packet header according to the embodiment of the present invention.

The 2-word decoder 346 decodes a 2-word header of a packet transmitted between cells. FIG. 9 shows the format of the 2-word packet header. Destination information contains an identifier (ID) of a destination cell of the packet header.

The interface 345 decodes the above described attributes using the 2-word decoder 346. If the received packet is an I/O packet, then it also decodes the function to check whether the instruction refers to a read or a write. If it is not an I/O packet, then Status is returned to the MSC.

Figure 10:
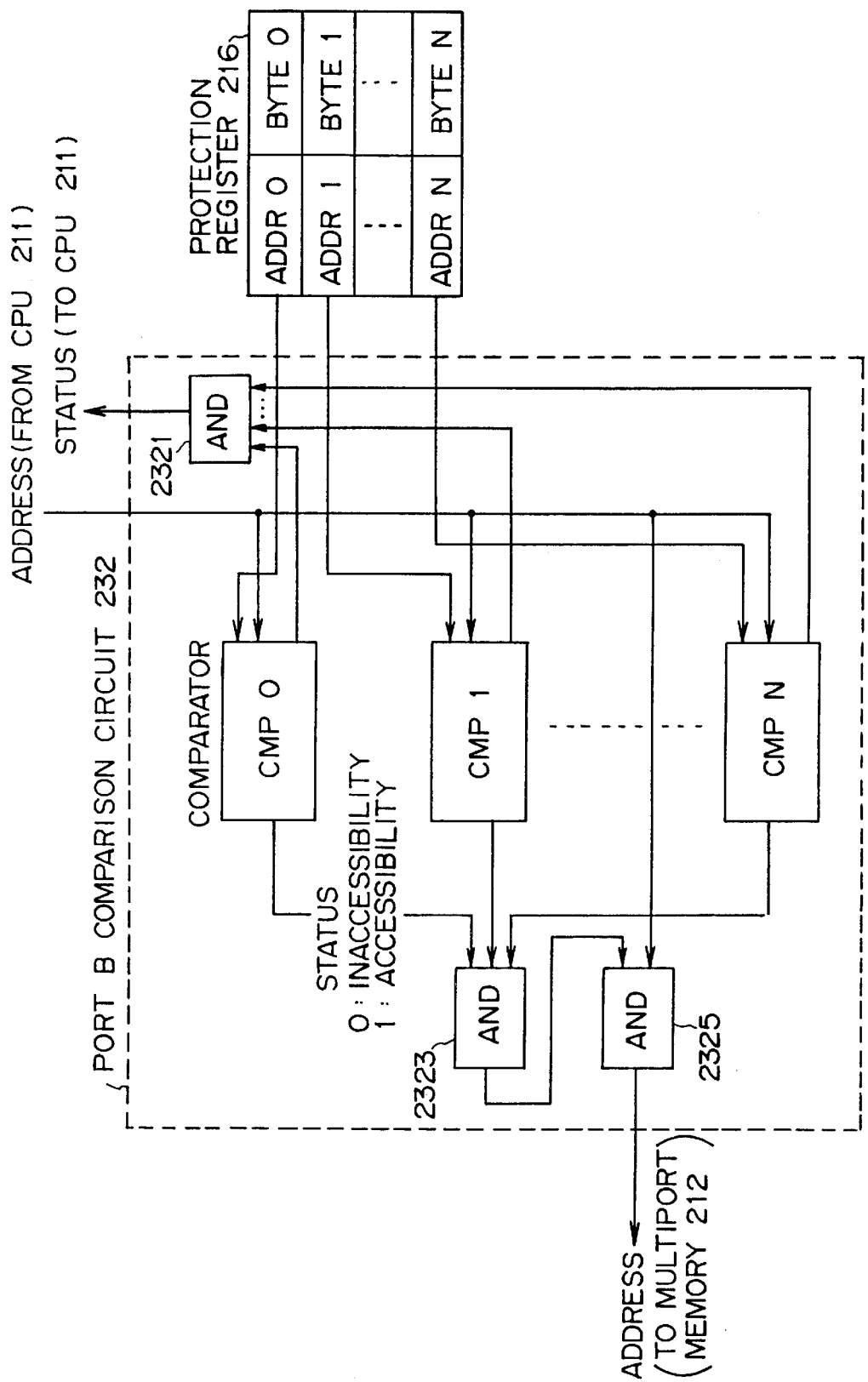
FIG. 10 is a block diagram showing an example of the configuration of the port A comparison circuit shown in FIG. 6.

FIG. 10 is a block diagram showing an example of the configuration of the port A comparison circuit 231. N protection registers 216 are mounted in this example. The port A comparison circuit 231 comprises N first comparators CMP 0, CMP 1, . . . CMP N corresponding one to one to each of the protection registers 216. These first comparators CMP 0, CMP 1, . . . CMP N receive the information (the first address and the number of bytes) set in the corresponding protection register 216 and the output address (the second address) of the CPU 211. Each of the first comparators CMP 0, CMP 1, . . . CMP N outputs 0 (indicating inaccessibility) if the second address is contained in the protection area determined according to the above described information received from the protection register 216, and outputs 1 (indicating accessibility) if the second address is not contained in the protection area. The status signal is output by each of the first comparators CMP 0, CMP 1, . . . CMP N to a first AND circuit 2311 and a second AND circuit 2313.

The first AND circuit 2311 outputs the AND operation result of the status signal received from each of the first comparators CMP 0, CMP 1, . . . CMP N to the CPU 211 as a status information Status. If the CPU 211 tries to access an area other than the protection area in the multiport memory 212, then the accessibility status information Status ("1") is returned to the CPU 211. On the other hand, if it tries to access the protection area, the inaccessibility status information Status ("0") is returned to the CPU 211.

The second AND circuit 2313 performs an AND operation similar to that in the first AND circuit 2311, and the operation result is output to an address selector 2315. The address selector 2315 receives an access address from the CPU 211, and outputs the address as an address signal to the multiport memory 212 if the signal from the second AND circuit 2313 is 1 (accessible). If the CPU 211 tries to access an area other than the protection area in the multiport memory 212, then the access address is output to the multiport memory 212.

Figure 11:
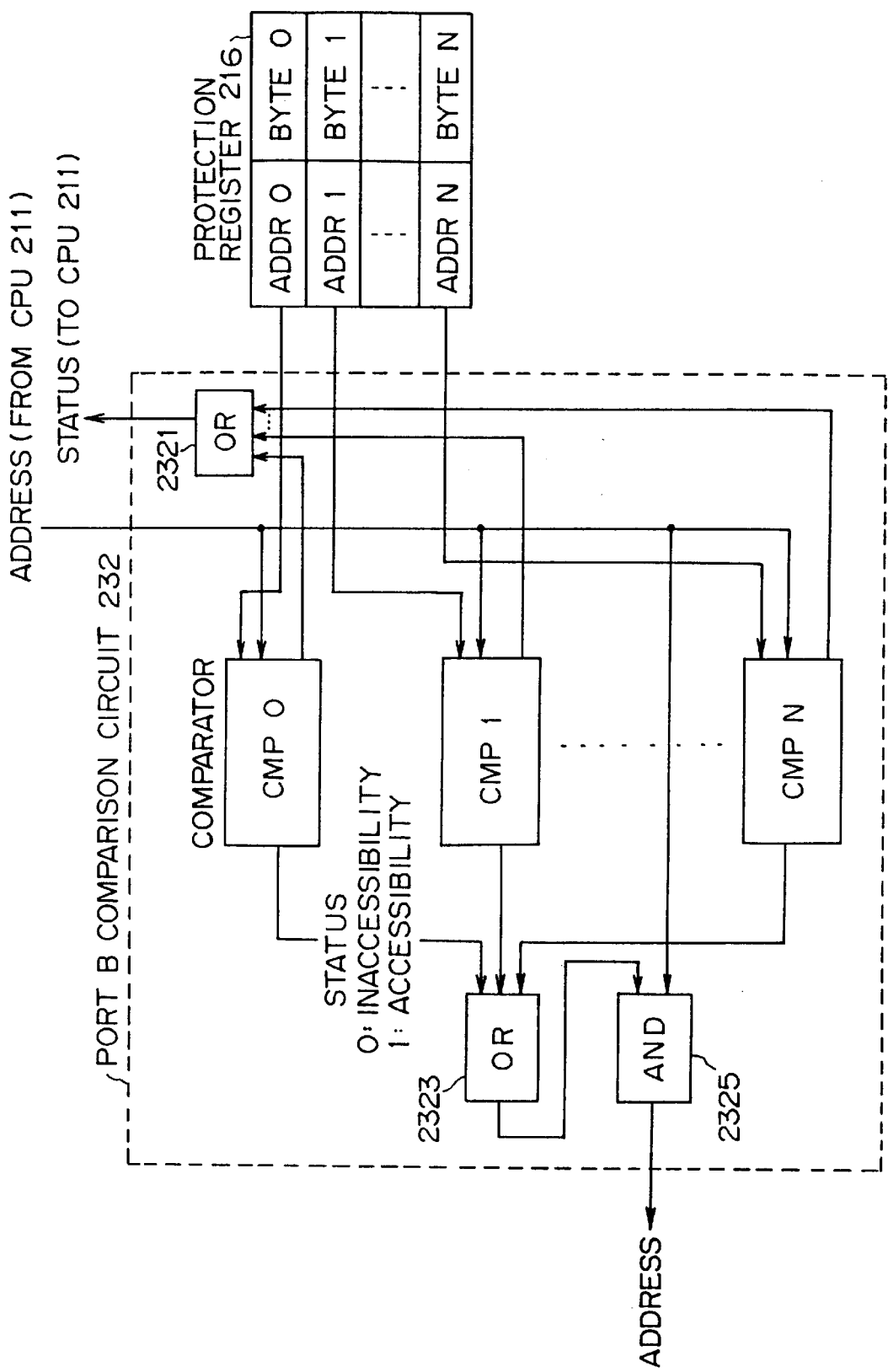
FIG. 11 is a block diagram showing an example of the configuration of the port B comparison circuit shown in FIG. 6.

FIG. 11 is a block diagram showing an example of the configuration of the port B comparison circuit 232. N protection registers 216 are mounted in the example shown in FIG. 11. The port B comparison circuit 232 comprises N second comparators CMP 0, CMP 1, . . . CMP N corresponding one to one to each of the protection registers 216. These second comparators CMP 0, CMP 1, . . . CMP N receive the information (the first address and the number of bytes) set in the corresponding protection register 216 and the output address (the third address) of the DMA controller 218. Each of the second comparators CMP 0, CMP 1, . . . CMP N outputs 0 (indicating inaccessibility) if the second address is contained in the protection area determined according to the above described information received from the protection register 216, and outputs 1 (indicating accessibility) if the second address is not contained in the protection area. The status signal is output by each of the second comparators CMP 0, CMP 1, . . . CMP N to a first OR circuit 2321 and a second OR circuit 2323.

The first OR circuit 2321 outputs the OR operation result of the status signal received from each of the second comparators CMP 0, CMP 1, . . . CMP N to the DMA controller 218 as a status information Status. If the DMA controller 218 tries to access the protection area in the multiport memory 212, then the accessibility status information Status ("0") is returned to the DMA controller 218. On the other hand, if it tries to access an area other than the protection area, the inaccessibility status information Status ("1") is returned to the DMA controller 218.

The second OR circuit 2323 performs an OR operation similar to that in the first OR circuit 2321, and the operation result is output to an address selector 2325. The address selector 2325 receives an access address from the DMA controller 218, and outputs the address as an address signal to the multiport memory 212 if the signal from the second OR circuit 2323 is "0"(accessible). If the DMA controller 218 tries to access the protection area in the multiport memory 212, then the access address is output to the multiport memory 212.

Figure 12:
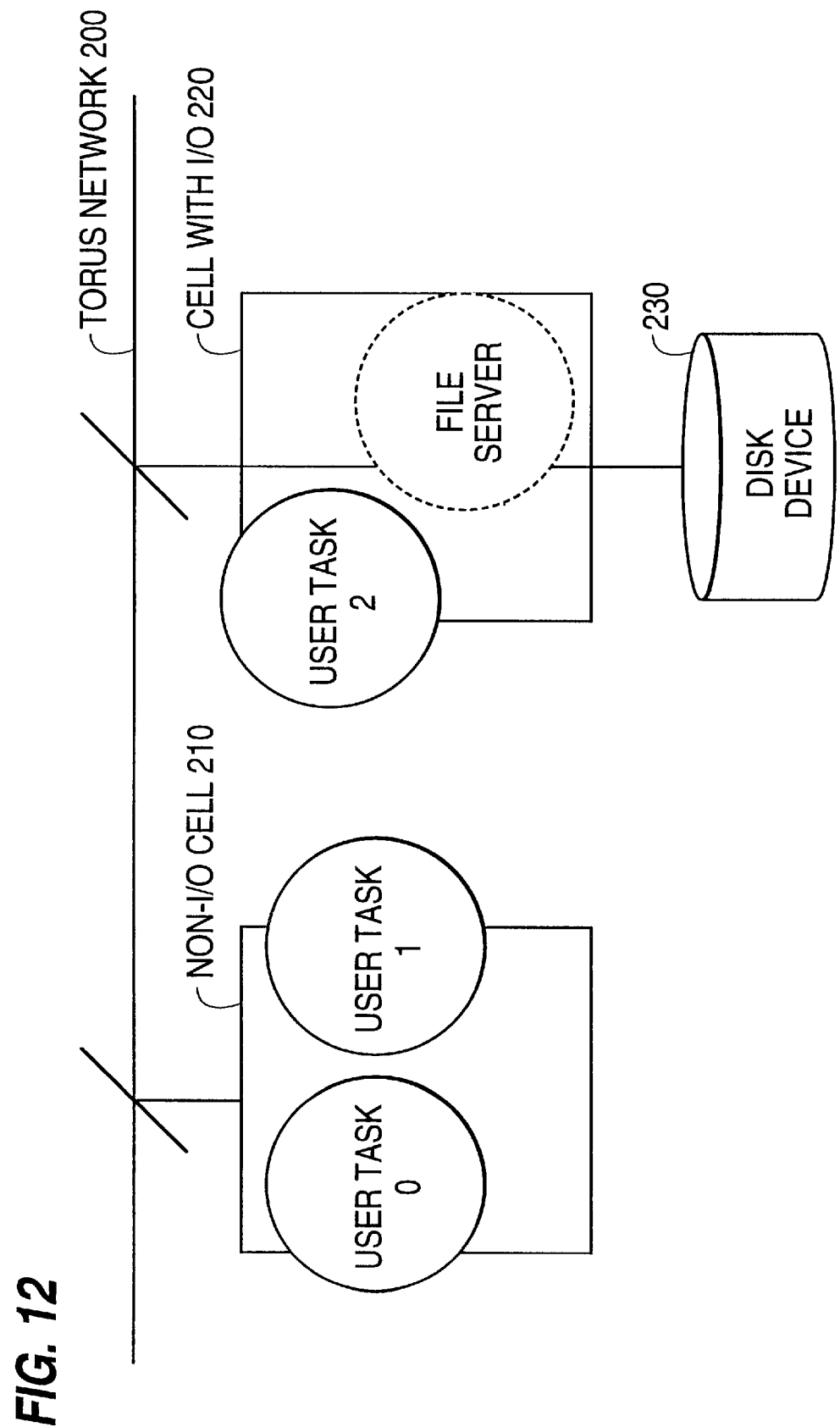
FIG. 12 shows the configuration of the software of the massively parallel processor system according to the present embodiment.

FIG. 12 shows the configuration of the software of the massively parallel processor system. The non-I/O cell 210 comprises a user task 0 and a user task 1. The I/O cell 220 comprises a user task 2 and a file server. When the related cell 220 receives an I/O packet from the non-I/O cell 210, the file server accesses the disk device 230, and reads or writes data if the packet is issued according to an I/O read instruction or an I/O write instruction. If a read instruction is issued, an answer packet is generated for the data sequentially read from the disk device 230, and the data is sequentially transmitted in plural packets to the non-I/O cell 210 over the torus network 200.

Figure 13:
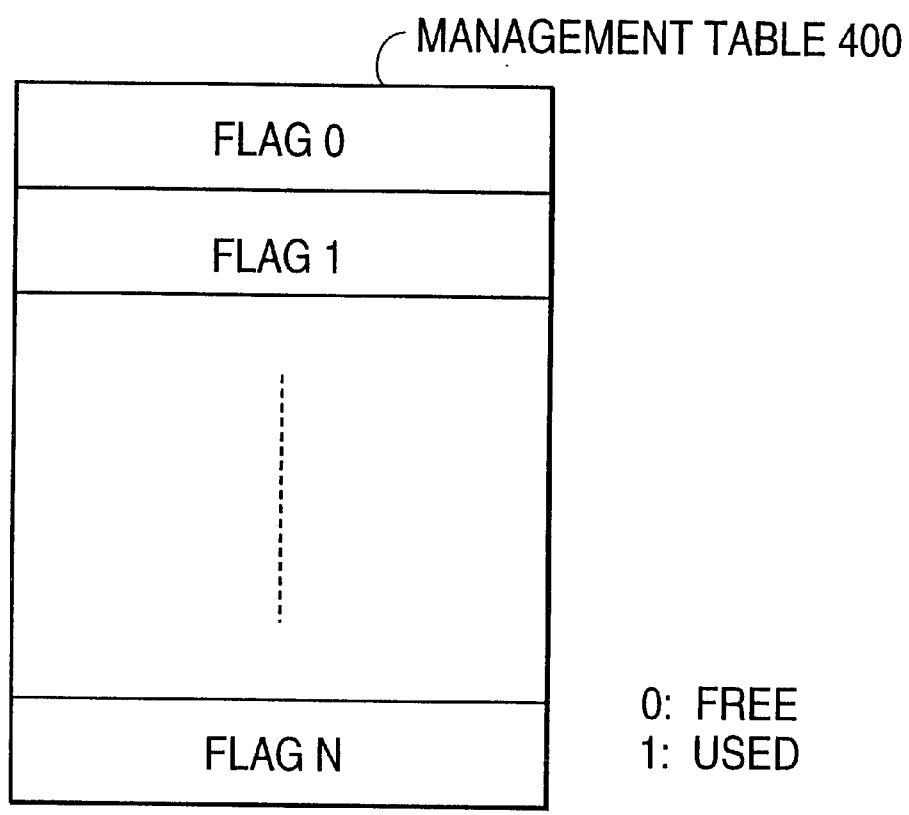
FIG. 13 shows an example of the configuration of the table for use in managing the protection register by the non-I/O cell.

A kernel of the non-I/O cell 210 manages space areas of the protection register 216 based on a management table 400 provided in the format shown in FIG. 13 in the multiport memory 212 to manage the protection register 216. The management table 400 is provided with N flags 402 (flag 0, flag 1, . . . , flag N) assigned one to one to each of the protection registers 216. The flag 402 of 0 indicates that the corresponding protection register 216 is available, and the flags 402 of 1 indicates that it is occupied.

Described below is the operation of the massively parallel processor system having the above mentioned configuration.

Explained first is the operation performed by the non-I/O cell 210 when data is read from the disk device 230 of the I/O cell 220. In this case, the user task of the non-I/O cell 210 issues an I/O read instruction in the following format.

read (fd, buf, byte);
where fd indicates a file identifier, buf indicates the leading address of the multiport memory 212 storing read data, and byte indicates the number of bytes of the data to be read. If the I/O read instruction is issued, the kernel of the non-I/O cell 210 first searches the management table 400 for an available protection register 216. If it is successfully found, the kernel sets respectively in the address section and the size section of the protection register 216 the address buf and the number of bytes byte specified by the I/O read instruction.

Thus, the read instruction sets the specified protection area in the multiport memory 212. The number of the protection register 216 is stored in the system until the data transmission is completed. Then, the driver 219 sends the packet of the I/O read instruction to the file server of the I/O cell 220 over the torus network 200. The header of the packet contains the information including the identifier of the non-I/O cell 210 (requesting cell ID), the function type indicating a read instruction, the protection register number, the number of the bytes or blocks of the transmitted data, the file identifier fd, etc.

The I/O cell 220 receives the instruction packet over the torus network 200, accesses the data block of the file in the disk device 230 specified by the read instruction, generates packets for accessed data, and transmits the answer packets to the requesting non-I/O cell 210 over the torus network 200. The second word of the packet header in the answer packet indicates the protection register number, the function type, the number of the bytes of transmitted data, etc. as shown in FIG. 9.

Figure 14:
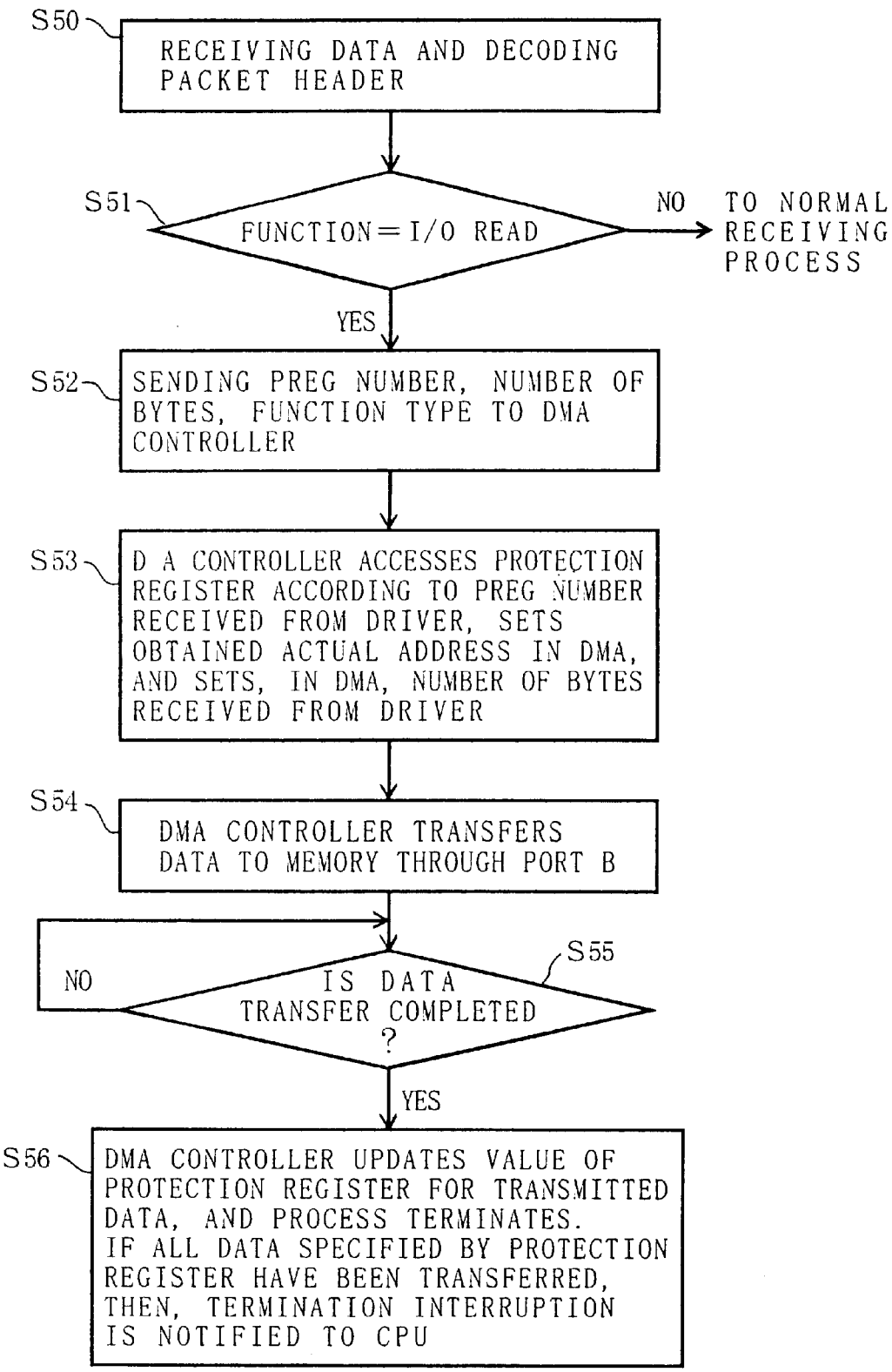
FIG. 14 is a flowchart showing the operation of the transfer control device performed when the I/O read instruction is executed by the non-I/O cell.

Upon receipt of the answer packet, the transfer control device 217 of the I/O cell 220 performs the processes indicated in the flowchart shown in FIG. 14. First, the interface 345 of the driver 219 receives data and decodes the packet header of the answer packet through the 2-word decoder 346 (step S 50). The interface 345 determines according to the decoding result whether or not the function refers to an I/O read instruction (step S 51). Otherwise (no in step S 51), the flowchart of a normal receiving process is followed.

If the function refers to an I/O read instruction (yes in step S 51), then the transfer control device 217 transmits to the DMA controller 218 the protection register number, number of bytes, and function type in the packet header of an answer packet through the interface 345 (step S 52). The DMA controller 218 accesses the protection register 216 having the protection register number received from the driver 219, and sets in the DMA register 2181 the address specified in the protection register 216. The number of the bytes of the data received from the driver 219 is set in the DMA register 2181 (step S53).

Then, the DMA controller 218 DMA-transmits the received data to the multiport memory 212 through port B (step S 54). The destination of the transmission data is a memory area set as a protection area by the protection register 216. If the DMA-transmission is completed (yes in step S 55), then the DMA controller 218 updates the contents of the protection register 216 depending on the number of the bytes of the transmission data, then terminating the operation. If all data specified by the protection register 216 have been transmitted, the CPU 211 is provided with an interruption indicating the termination of the transmission.

Thus, completed is the operation of the I/O read instruction.

Explained next is the operation performed by the non-I/O cell 210 when data is written to a file in the disk device 230 from the I/O cell 220. In this case, the user task of the non-I/O cell 210 issues an I/O write instruction in the following format.

write (fd, buf, byte);
where fd indicates a file identifier, buf indicates the leading address of the multiport memory 212 storing data to be written to the file, and byte indicates the number of bytes of the data to be written. If the I/O read instruction is issued, the kernel of the non-I/O cell 210 first searches the management table 400 for an available protection register 216. If it is successfully found, the kernel sets respectively in the address section and the size section of the protection register 216 the address buf and the number of bytes byte specified by the I/O write instruction.

Thus, the write instruction sets a specified protection area assigned the leading address buf and the data length of byte in the multiport memory 212. The number of the protection register 216 is stored in the system until the data transmission is completed. Then, the driver 219 sends the packet of the I/O write instruction to the file server of the I/O cell 220 over the torus network 200. The header of the packet contains the information including the identifier of the requesting non-I/O cell 210 (ID), the function type indicating a write instruction, the protection register number, the number of the bytes or blocks of the transmitted data, the file identifier fd, etc. The body of the packet stores the data to be written to the file having the file identifier fd in the disk device 230.

Upon receipt of the packet of the I/O instruction, the I/O cell 220 sequentially divides data stored in the packet into units of predetermined length and writes the divided data to the file having the above described file identifier, sequentially generates answer packets for written data, and returns the answer packets to the non-I/O cell 210 which has issued the I/O write instruction over the torus network 200. The second word in the answer packet sets the information such as the protection register number, function type, number of the bytes of written data specified by the non-I/O cell 210 through the I/O instruction packet, etc.

Figure 15:
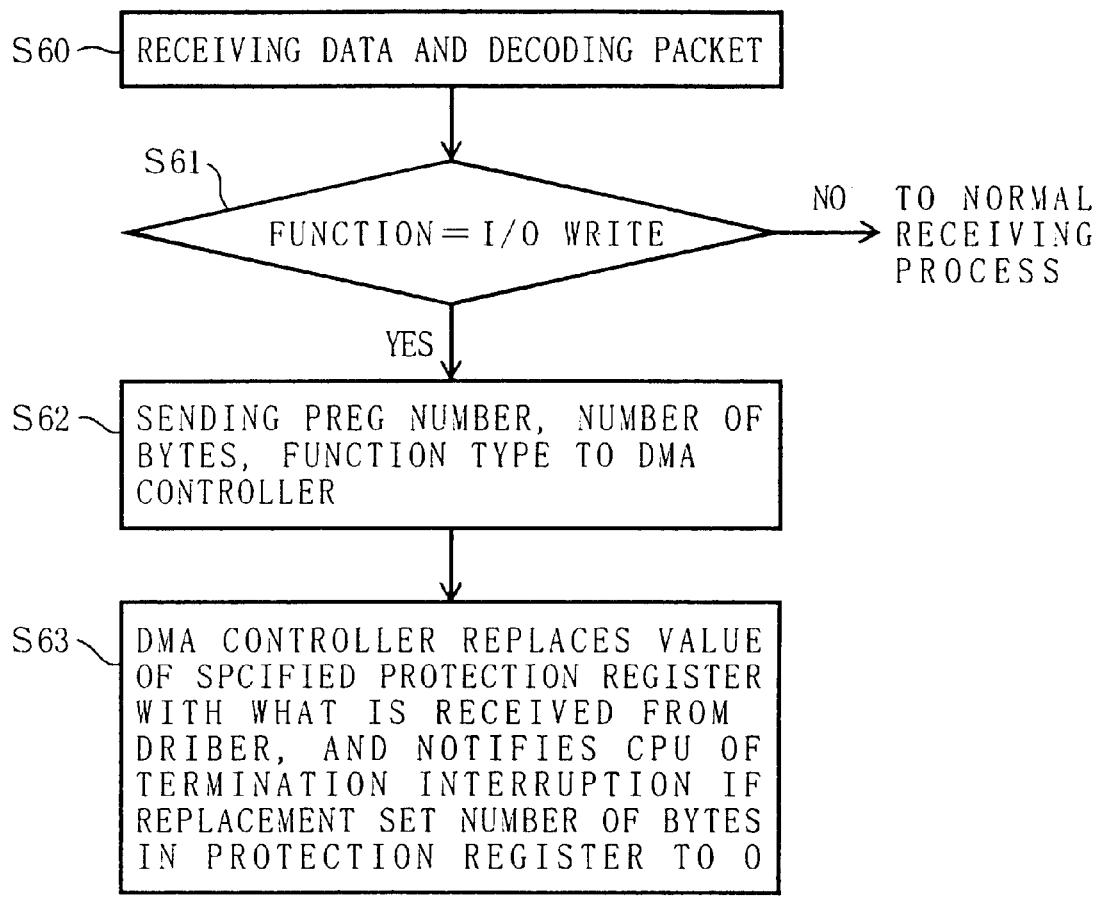
FIG. 15 is a flowchart showing the operation of the transfer control device performed when the I/O write instruction is executed by the non-I/O cell.

Upon receipt of the answer packet over the torus network 200, the transfer control device 217 of the non-I/O cell 210 performs the process indicated by the flowchart shown in FIG. 15. First, the interface 345 of the driver 219 decodes the header of the answer packet using the 2-word decoder 346 (step S 60). Based on the decoding result, it determines whether or not the function refers to an I/O write instruction (step S 61). If not, it performs the process by following the flowchart of the normal receiving process.

On the other hand, if the function refers to the I/O write instruction, then the protection register number, number of bytes, and function type are transmitted to the DMA controller 218 (step S 62). The DMA controller 218 updates the contents of the protection register 216 having the protection register number received from the driver 219 by the number of bytes informed from the driver 219. Then, it removes protection from the protection area of the multiport memory 212 where the data informed of as having been written is stored (step S 62). If the size section indicates 0 as the number of bytes after the update, then the CPU 211 is informed of an interruption.

Thus, completed is the operation of the I/O write instruction.

According to the present embodiment, when an I/O request such as an I/O read instruction, etc. for writing data to a file in the disk device 230 is issued, the CPU 211 of the non-I/O cell 210 can immediately read received data from the area where the data is stored and process the data. When an I/O request such as an I/O write instruction, etc. for writing data to a file in the disk device 230 is issued, the CPU 211 of the non-I/O cell 210 can sequentially process data in the order of reception without an I/O termination interruption informing the completion of the transmission of all data. Therefore, the non-I/O cell 210 can concurrently process the a user task performed by the CPU 211 and an I/O operation performed by the transfer control device 217 for the disk device 230 connected to the I/O cell 220, thereby efficiently improving the throughput and system performance of the CPU 211 of the non-I/O cell 210.

According to the present embodiment, the protection register 216 manages the memory protection area of the multiport memory 212. The system can also be designed to manage the memory protection area using a directory. A network, which connects the cells 210 and 220, is not limited to the two-dimensional torus network 200, but can be designed as a static network such as a two- or three-dimensional mesh network, hypercube network, one-dimensional array network, ring network; and a dynamic network such as a cross-bar network, omega network, Benes network, etc.

According to the embodiment, the non-I/O cell 210 accesses a file in the disk device 230 of the I/O cell 220. Obviously, I/O cells 220 can access files in the disk devices 230 of each other.

The present embodiment is not limited to the above embodiment. For example, it applies to a parallel computer system having distributed and shared memories or having a partially shared memory, and to a distribution system which distributes files and a database to a plurality of computers. A single computer can utilize the present invention to improve the throughput when data are read and written to an external input/output device. Variations of the technology of the present invention are disclosed in the claims.

What is claimed is:

1. A computer system including a data processing device and a transfer control device for transmitting data at a request of the data processing device between the data processing device and an external device, comprising:
   a multiport memory comprising a first port and a second port and having a protection area set therein;
   memory protection setting means for setting a protection area in said multiport memory;
   memory protection management means for notifying the data processing device of inaccessibility when the data processing device accesses from the first port the memory protection area in said multiport memory and for notifying the data processing device of inaccessibility when the transfer control device accesses from the second port an area other than the protection area in said multiport memory; and
   protection area change means for changing a range of the protection area, when said transfer control device reads data from or writes data to the protection area in said multiport memory, releasing a data read or write area from the protection area.

2. The computer system according to claim 1, wherein said memory protection setting means comprises storage means for storing information for use in determining the range of each protection area set in said multiport memory; and
   said protection area change means changes the range the protection area by changing contents of the storage means.

3. The computer system according to claim 2, wherein said storage means comprises a register provided one to one for each protection area to set information about the range of the protection area.

4. The computer system according to claim 2, wherein said memory protection management means determines, by referring to the storage means in said memory protection setting means, whether or not the data processing device or said transfer control device is allowed to access said multiport memory.

5. The computer system according to claim 2, wherein said transfer control device comprises:
   a DMA controller for writing data received from the external device to the protection area in said multiport memory through the second port by a direct memory access; and
   said protection area change means for changing the range of the protection area set by said memory protection setting means according to a write of data to the protection area through said DMA controller.

6. The computer system according to claim 1, wherein said transfer control device comprises:
   a DMA controller for reading data to be transmitted to the external device from the protection area of said multiport memory through the second port by a direct memory access; and
   said memory protection setting means for changing the range of the protection area set by said memory protection setting means according to a read of data from the protection area through said DMA controller.

7. A computer system in which a plurality of cells are interconnected over a network to transmit data by communicating messages over the network, each cell comprising:
   a transfer control device for communicating a message with another cell over the network;
   a multiport memory comprising a first port and a second port and having a protection area set therein;
   memory protection setting means for setting a protection area in said multiport memory;
   memory protection management means for notifying a data processing device of inaccessibility when the data processing device accesses from the first port the memory protection area in said multiport memory and for notifying the data processing device of accessibility when the transfer control device accesses from the second port the protection area in said multiport memory; and
   protection area change means for changing a range of the protection area when said transfer control device reads data from or writes data to the protection area in said multiport memory, releasing a data read or write area from the protection area, wherein
   said cell as a requesting cell transmits an I/O read instruction packet to the other cell through said transfer control device over the network when reading data from an external device connected to the other cell;

when the other cell receives the I/O read instruction packet through its own transfer control device, the other cell reads data specified by the I/O read instruction packet from the external device, generates an answer packet assigned data and information at least indicating a size of data for each piece of read data, and transmits the packet by said transfer control device to the requesting cell through the network;

each time the requesting cell receives the answer packet through said transfer control device therein via the network, said transfer control device retrieves the received data from the answer packet and writes the received data to the protection area in said multiport memory through the second port; and said protection area change means changes the range of the protection area set by said memory protection setting means according to information set in the answer packet.

8. The computer system according to claim 7, wherein said transfer control device comprises packet sending means for generating the I/O read instruction packet and sending it to the other cell over the network.

9. The computer system according to claim 8, wherein said packet sending means sets, at a header of the I/O read instruction, information specifying the protection area in said multiport memory which stores data read by the I/O read instruction.

10. The computer system according to claim 9, wherein said transfer control device comprises setting means for setting, at a header of the answer packet corresponding to the I/O read instruction packet, the information specifying the protection area in said multiport memory according to settings in the I/O read instruction packet.

11. The computer system according to claim 10, wherein said transfer control device retrieves the information specifying the protection area in said multiport memory from a received answer packet, and writes data stored in the answer packet to the protection area.

12. The computer system according to claim 8, wherein said packet sending means sets function information indicating an I/O read instruction at the header of the I/O read instruction packet.

13. The computer system according to claim 12, wherein said transfer control device sets the function information indicating an I/O read instruction at the header of the answer packet corresponding to the I/O read instruction packet.

14. The computer system according to claim 13, wherein said transfer control device decodes a header of a received packet to confirm that the received packet is an answer packet to the I/O read instruction packet.

15. The computer system according to claim 7, wherein said memory protection setting means comprises storage means for storing information for use in determining the range of each protection area set in said multiport memory; and said protection area change means changes the range the protection area by changing contents of the storage means.

16. The computer system according to claim 15, wherein said storage means comprises a register provided one to one for each protection area to set information about the range of the protection area.

17. The computer system according to claim 16, wherein said memory protection management means determines, by referring to the storage means in said memory protection setting means, whether or not the data processing device or said transfer control device is allowed to access said multiport memory.

18. The computer system according to claim 7, wherein said transfer control device comprises:

a DMA controller for writing data received from the external device to the protection area in said multiport memory through the second port by a direct memory access; and said protection area change means for changing the range of the protection area set by said memory protection setting means according to a write of data to the protection area through said DMA controller.

19. The computer system according to claim 7, wherein said transfer control device comprises:

a DMA controller for reading data to be transmitted to the external device from the protection area of said multiport memory through the second port by a direct memory access; and said memory protection setting means for changing the range of the protection area set by said memory protection setting means according to a read of data from the protection area through said DMA controller.

20. A computer system in which a plurality of cells are interconnected over a network to transmit data by communicating messages over the network, each cell comprising:

a transfer control device for communicating a message with another cell over the network;

a multiport memory comprising a first port and a second port and having a protection area set therein;

memory protection setting means for setting a protection area in said multiport memory;

memory protection management means for notifying a data processing device of inaccessibility when the data processing device accesses from the first port the memory protection area in said multiport memory and for notifying the data processing device of accessibility when the transfer control device accesses from the second port the protection area in said multiport memory; and protection area change means for changing a range of the protection area when said transfer control device reads data from or writes data to the protection area in said multiport memory, releasing a data read or write area from the protection area, wherein when said cell as a requesting cell writes data to an external device connected to the other cell, said transfer control device reads data from the protection area in said multiport memory and transmits the data to the other cell over the network through an I/O write instruction packet;

when the other cell receives an I/O write instruction through said transfer control device therein, said transfer control device writes data stored in the I/O write instruction packet to the external device, and transmits, for each piece of written data, information of the data to the requesting cell through an answer packet over the network; and each time said transfer control device of the requesting cell receives the answer packet over the network, said protection area change means updates contents of the memory protection area set by said memory protection setting means based on the information of the written data set in the answer packet.

21. The computer system according to claim 20, wherein said transfer control device comprises packet sending means for generating the I/O read instruction packet and sending it to the other cell over the network.

22. The computer system according to claim 21, wherein said packet sending means sets, at a header of the I/O read instruction, information specifying the protection area in said multiport memory which stores data read by the I/O read instruction.

23. The computer system according to claim 22, wherein said transfer control device comprises setting means for setting, at a header of the answer packet corresponding to the I/O read instruction packet, the information specifying the protection area in said multiport memory according to settings in the I/O read instruction packet.

24. The computer system according to claim 23, wherein said transfer control device retrieves the information specifying the protection area in said multiport memory from a received answer packet, and writes data stored in the answer packet to the protection area.

25. The computer system according to claim 20, wherein said packet sending means sets function information indicating an I/O read instruction at the header of the I/O read instruction packet.

26. The computer system according to claim 25, wherein said transfer control device sets the function information indicating an I/O read instruction at the header of the answer packet corresponding to the I/O read instruction packet.

27. The computer system according to claim 26, wherein said transfer control device decodes a header of a received packet to confirm that the received packet is an answer packet to the I/O read instruction packet.

28. The computer system according to claim 20, wherein said memory protection setting means comprises storage means for storing information for use in determining the range of each protection area set in said multiport memory; and said protection area change means changes the range the protection area by changing contents of the storage means.

29. The computer system according to claim 28, wherein said storage means comprises a register provided one to one for each protection area to set information about the range of the protection area.

30. The computer system according to claim 28, wherein said memory protection management means determines, by referring to the storage means in said memory protection setting means, whether or not the data processing device or said transfer control device is allowed to access said multiport memory.

31. The computer system according to claim 20, wherein said transfer control device comprises:
a DMA controller for writing data received from the external device to the protection area in said multiport memory through the second port by a direct memory access; and
said protection area change means for changing the range of the protection area set by said memory protection setting means according to a write of data to the protection area through said DMA controller.

32. The computer system according to claim 20, wherein said transfer control device comprises:
a DMA controller for reading data to be transmitted to the external device from the protection area of said multiport memory through the second port by a direct memory access; and
said memory protection setting means for changing the range of the protection area set by said memory protection setting means according to a read of data from the protection area through said DMA controller.

33. A computer system including a plurality of computer cells interconnected over a network enabling communications among the computer cells via message packets containing data, each cell comprising:
a multiport memory comprising a first port and a second port, and a memory protection area set therein;
a data processor accessing the multiport memory through the first port;
a transfer control device accessing the multiport memory through the second port; and
a memory protection manager releasing the memory protection area when the transfer control device completes a data write operation into said memory protection area.

34. A method of preserving data integrity in a computer system including a data processor and transfer control device capable of simultaneously accessing a multiport memory, comprising:
reserving a protected memory area in said multiport memory for writing of data by the transfer control device; and
releasing the protected memory area when the transfer control device completes a data write operation into said protected memory area.

* * * * *